United States Patent [19]

Evans

[11] Patent Number: 4,909,621

[45] Date of Patent: Mar. 20, 1990

[54] METHOD OF MAKING HYDROGEL CONTACT LENSES HAVING ASPHERIC FRONT SURFACES

[76] Inventor: Cyril C. H. Evans, 75 The Donway West, Ste. 714, Don Mills, Ontario, Canada, M3C 2E9

[21] Appl. No.: 85,755

[22] Filed: Aug. 17, 1987

[51] Int. Cl.⁴ .................................................. G02C 7/04
[52] U.S. Cl. ................................. 351/161; 351/160 H
[58] Field of Search ...................... 351/177, 161, 160 H

[56] References Cited

U.S. PATENT DOCUMENTS

| | | | |
|---|---|---|---|
| 3,142,140 | 7/1964 | Ishida | 351/169 |
| 3,482,906 | 12/1969 | Volk | 351/160 R |
| 3,950,082 | 4/1976 | Volk | 351/161 |
| 4,194,815 | 3/1980 | Trombley | 351/160 R |
| 4,195,919 | 4/1980 | Shelton | 351/160 R |
| 4,199,231 | 4/1980 | Evans | 351/161 |
| 4,418,991 | 12/1983 | Breger | 351/161 |
| 4,640,595 | 2/1987 | Volk | 351/161 |

Primary Examiner—Bruce Y. Arnold
Assistant Examiner—Terry S. Callaghan
Attorney, Agent, or Firm—John P. Snyder

[57] ABSTRACT

A contact lens of soft, pliable opthalmic plastic material, said lens when in its dehydrated state having a spherical back surface which in its hydrated state conforms to the corneal curvature of the wearer's eye and, when in its dehydrated state, having an aspheric front surface which is a surface of revolution of polar coordinate form, having an asphericity which is a function of $(n)[f]<\sin(a)>$ where (a) is the polar angle, and (n) is a radial offset of a tool-controlling circular surface.

3 Claims, 5 Drawing Sheets

METHOD OF MAKING HYDROGEL CONTACT LENSES HAVING ASPHERIC FRONT SURFACES

BACKGROUND OF THE INVENTION

This invention relates to novel soft contact lenses and to the method of and apparatus for making same. Lenses having aspheric curvature are disclosed in the Evans Pat. No. 4,199,231, the disclosure of which is incorporated herein by reference, and it is to be noted that this invention represents an improvement over such patent.

The aspheric curves according to the Evans patent were developed particularly to provide visual correction for presbyopes, with or without correction for astigmatism, or for prepresbyopic astigmats. Correctly fitted, these lenses provide excellent correction from near or reading distance to infinity for such users.

The aspheric curves according to the Evans patent are expressed in polar coordinate form in which the radius of curvature, p, is of the form:

$$p = R + kR[1 - \cos(a)]/[1 + \cos(a)] \text{ where:}$$

k is an empirically derived value lying between 0.005 and 0.1 and is determined from the characteristics of the lens material and (a) is the polar angle.

These aspheric curvatures have proven to be particularly difficult to generate and virtually impossible to cut reproducibly. In consequence, these lenses have not met with wide acceptance even though when correctly generated and fitted, they provide excellent optical performance which cannot be duplicated by any other lens currently available. The reason for the difficulty in generating these lenses is that the asphericity, particularly at values of (a) up to about 10° (20° optic zone) are of very small amounts. The Evans patent aspheric surface is of ellipsoidal configuration deviating from a spherical surface only by amounts which are measured accurately only in microns or fractions thereof. For example, for an aspheric lens of this type having a radius at the center of the lens of 8.0 mm, the maximum asphericity or deviation from this radius at the peripheral edge of the lens [angle(a)=35°] is equal to:

k(0.795306610148), which upon substituting the normally used value of k (0.015) yields 0.0119 mm as the maximum asphericity E'. For small values of (a), the asphericities will be so small as are barely measurable much less capable of accurate generation. For example, at a value of (a) of 5°, the asphericity in the above case will be 0.0002 mm. Even though contact Lens lathes, such as the Hardinge lathe, are available which will very accurately generate or cut a spherical surface, no technique has been found which will generate the Evans aspheric surfaces accurately and reproducibly.

BRIEF SUMMARY OF THE INVENTION

Accordingly, this invention is directed to a modified aspheric surface which yields optical results nearly indistinguishable from those attained by the Evans asphericity but which, in contrast thereto, is accurately and reproducibly controllable.

Basically, this invention concerns a modified Evans patent asphericity which is capable of production by simple means requiring a minimum of modification to existing lathes which are otherwise capable of generating spherical lens surfaces with great accuracy. In accord with this object of the invention, a simple circular surface capable of being adjusted a measurable and controllable amount and cooperating with a flat surface bearing tangentially thereagainst, is employed as the controlling surface for generating the modified aspheric surface.

In accord with the above object of the invention, the circular controlling surface is readily and accurately mounted coaxially with the pivot post of the spherical cutting attachment of the lathe. It is preferable that the circular controlling surface is also mounted in this coaxial relation with provision for rotating it about the common axis to an angular setting (m) which is selected to achieve a best match condition with respect to the asphericity of the Evans patent.

Another object of this invention is to provide method and apparatus for deviating aspherically from an accurately set spherical curvature which would otherwise be cut by a standard contact lens cutting lathe such as the Hardinge lathe. Accordingly, an object of the invention is to provide a modified optical radius attachment for Hardinge lathes in particular, although the invention is equally adapted to other and different type lathes.

An object of this invention resides in the provision of an improved form of aspheric surface particularly adapted for use in conjunction with soft contact lenses, simulating the asphericity as taught by the Evans patent. In accord with this object, the aspheric surface in polar coordinates may be a function of the sine of the polar angle.

Another object of this invention is to provide a method and apparatus wherein a lens blank is rotated about a lathe spindle axis while a cutting tool is initially engaged with the blank at the vertex of the lens while centered for swinging about an axis perpendicular to the spindle axis. As the tool is swung arcuately from the vertex to cut the blank, the swinging radius of the tool is progressively increased to a maximum as it moves toward and approaches the peripheral portion of the blank, in accord with the asphericity in accord with this invention.

A further object of the invention is to provide a method wherein the cutting tool and the lens blank are in "floating" relation to each other, the cutting tool and lens blank being under control of mechanism which slightly elongates the radius of arc of the cutting tool with respect to the blank as the tool cuts the lens surface being generated.

In another aspect, the invention controls the "floating" relation of the tool relative to the blank through the medium of an entity which is of a simple circular form and can thus be made with extreme accuracy, in conjunction with a flat surface bearing tangentially against the circular surface. Specifically, use may be made of an accurately formed part-cylindrical or circular surface, working in combination with a flat surface bearing tangentially against the circular surface and controlling the asphericity of the lens surface being generated by the lathe.

In accord with the above, it is preferred that the center of the circular outer surface is radially offset from the swinging axis of the lathe tool post, to be disposed laterally of the spindle axis, and the flat surface is perpendicular to a vertical plane containing the lathe spindle axis and in tangential engagement with the circular surface when the tool is aligned with and cutting at the vertex of the lens. The tool is swung about the fixed rotational axis of the tool post, and in the process, the flat surface which swings with the tool and bears tangentially against the circular surface will cause the necessary slight deviation of the cutting radius of the tool, dependent upon the lateral offset of its center as controlled by the aforesaid radial offset. Control of the asphericity produced may be exercised by accurately adjusting the lateral offset of the center of curvature of the circular surface with respect to the lathe spindle axis. Of immense value in connection with this invention is the fact that the radial offset (n) is sufficiently large as admits of accurate and reproducible adjustment.

Accordingly, it is an object of this invention to provide a system for generating aspheric contact lenses, particularly contact lenses made of hydrogel or like soft contact lens material, wherein the asphericity of the anterior surface of the lens may be generated accurately and reproducibly by practical, simple and effective means to simulate the aspheric curvature of the Evans patent.

In another aspect, the invention is directed to the use of a simple circular surface in combination with a flat surface bearing tangentially thereagainst to impart asphericity to a lens surface which would otherwise be of spherical form.

It is preferred in connection with this invention to locate the center of the circular surface coaxial with the center of the swinging axis of the tool and to produce the lateral offset by radially adjusting the center of the controlling surface from the center of the swinging axis. It is further preferred that the mounting and adjusting mechanism of the controlling circular surface be rotationally positioned at an angle (m) about the swinging axis so that the line of radial adjustment is contained in a vertical plane which includes the angle (m) with respect to a vertical plane containing the spindle axis.

In accord with this invention, asphericity is produced by the simple expedient of a laterally offset circular surface in combination with a flat surface bearing tangentially thereagainst and swinging with the tool, with the radial offset which results in the lateral offset required to achieve the desired asphericity being sufficiently large as can be accurately adjusted and set.

DETAILED DESCRIPTION OF THE INVENTION

Figure 2:
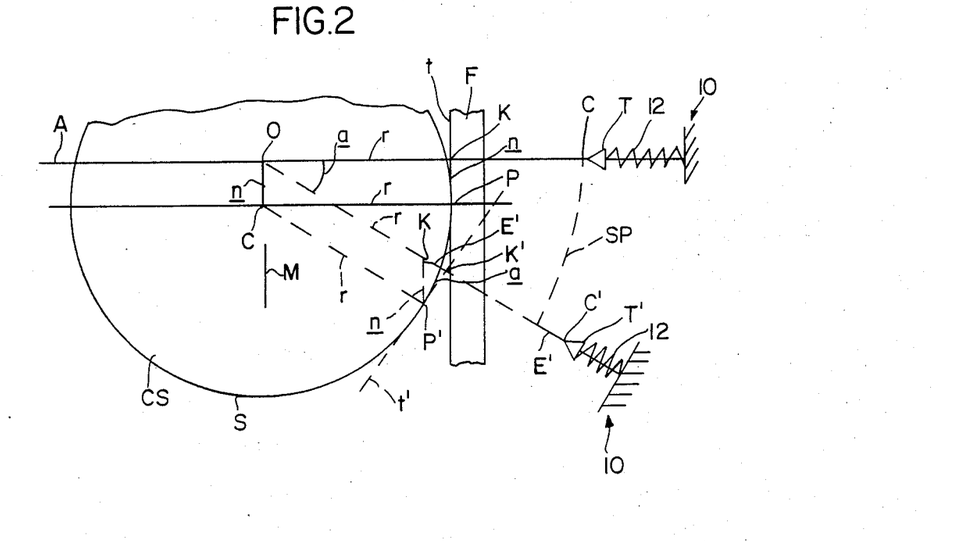
FIG. 2 is an enlarged diagrammatic view illustrating the principles of this invention.
Figure 2A:
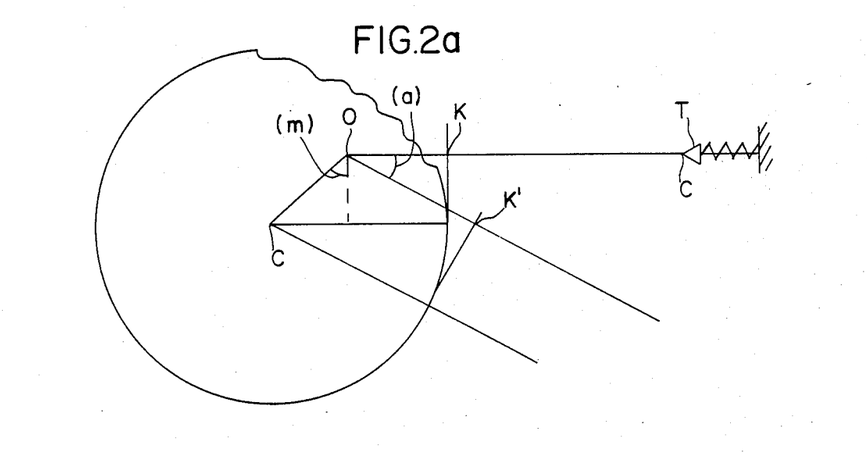
FIG. 2a is a view similar to FIG. 2 but showing the mounting for angularity (m)
Figure 2B:
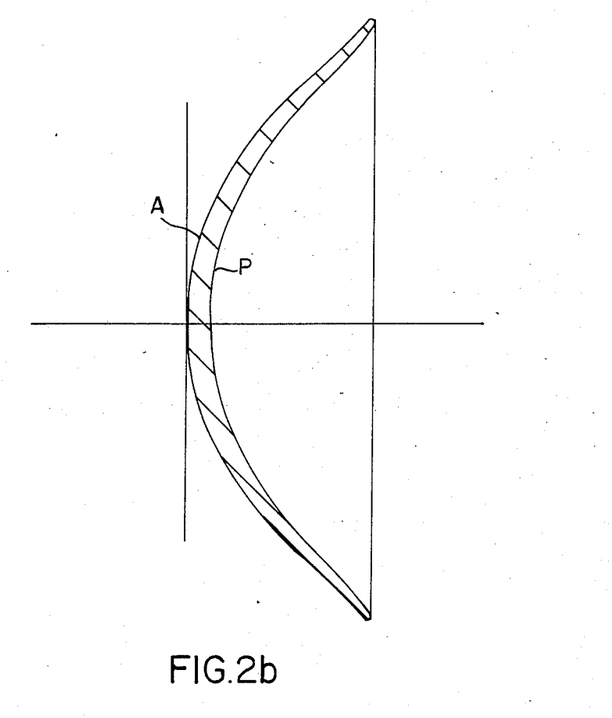
FIG. 2b is a view derived from FIG. 1 of the Evans Pat. No. 4,199,231, illustrating the shape of a lens as herein contemplated.

FIG. 2b illustrates a cross section of a lens in accord with this invention. The posterior surface P conforming to the corneal surface of the wearer's eye and is provided with a front, or anterior, surface A which is aspheric in accord with the polar equations disclosed in this invention.

The preferred equation of asphericity in accord with this invention, in polar coordinate form, is:

$$p = R + E' = R + (n)[\sin(m) - \sin(m-a)], \quad (1)$$

where R is the radius of the lens surface at the vertex, E' is asphericity, r is the radius of the controlling circular surface, and (n) is the radial offset factor, at the fixed angle (m), of the controlling circular surface, all as explained below.

With reference to the Evans patent, the polar coordinate equation is:

$$p = R + kR[1 - \cos(a)]/[1 + \cos(a)] \quad (2)$$

or $$p = R + E' \quad (3)$$

where E' is asphericity equal to kE where $$E = R[1 - \cos(a)]/[1 + \cos(a)] \quad (4)$$

It will be noted from comparing equation (1) with equation (2) that whereas equation (2) contains the asphericity term E' which is $k[1-\cos(a)]/[1+\cos(a)]$ which defines the ellipsoidal nature of the aspheric lens surface which differs from the aspherical case where $k=0$, equation (1) of this invention does not contain this complex asphericity term, but only the term $(n)[\sin(m-a)+\sin(m)]$ which, because (m) is fixed, involves only the term $\sin(m-a)$ which is a simple function of the sine of the polar angle. This invention therefore does not result in the precise ellipsoidal curves as specified in the Evans patent, as should be evident from comparison of the equations. Unexpectedly, however, the optical performance of this invention cannot subjectively be differentiated from that of the Evans patent, provided one or both of the parameters (n) and (m) is properly controlled. Insofar as can be determined from subjective tests, this invention represents an improvement over the Evans patent in that the same optical performance is obtained but the lenses of this invention are easily generated, accurately and reproducibly by, for example, the addition of a simple attachment to a contact lens lathe by modification of its optical radius turning attachment.

The following tables will illustrate the different natures of the aspheric curves according to the Evans patent (TABLE I) and according to this invention (TABLE II). I have found that it is most convenient to "standardize" the radius of the front surface of the lens at 7.5 mm since this radius is more or less of a mean radius which will be encountered in meeting the presciption requirements of most patients. In Table I, the asphericities listed are calculated on the basis of $R=7.5$ mm and $k=0.015$. In TABLE II, this same radius is used with $(m)=0°$ and with various values of (n) to observe the match of the resulting asphericities with those of TABLE I. In TABLE II, the angle (m) is varied to observe the match of asphericities with respect to TABLE I and, lastly, in TABLE IV both (m) and (n) are varied to again observe the match with respect to TABLE I.

TABLE I

| Angle (a) | Asphericity kR[1 − cos(a)]/[1 + cos(a)], Evans patent, with R = 7.5 mm and k = .015. |
|---|---|
| 5° | .0002 mm |
| 10° | .0009 mm |
| 15° | .0020 mm |
| 20° | .0035 mm |
| 25° | .0055 mm |
| 30° | .0081 mm |
| 35° | .0112 mm |

TABLE II

| Angle (a) | (n) = .019 mm | (n) = .016 mm | (n) = .013 mm |
|---|---|---|---|
| 5° | .0016 mm | .0013 mm | .0011 mm |
| 10° | .0032 mm | .0027 mm | .0022 mm |
| 15° | .0049 mm | .0041 mm | .0033 mm |
| 20° | .0064 mm | .0054 mm | .0044 mm |
| 25° | .0080 mm | .0067 mm | .0054 mm |
| 30° | .0095 mm | .0080 mm | .0065 mm |
| 35° | .0108 mm | .0091 mm | .0074 mm |

Figure 1:
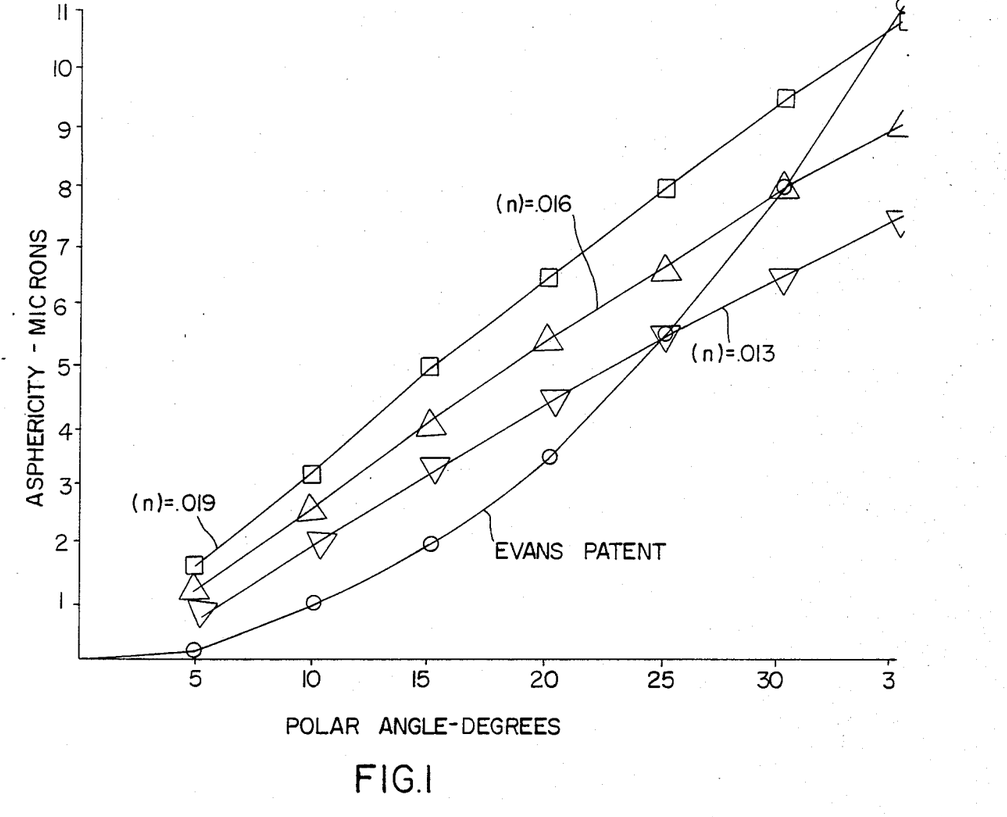
FIG. 1 is a graph illustrating the relationships noted in Tables I and II.

From Tables I and II, it will be seen that the asphericity in accord with TABLE II of this invention deviates, with n=0.019 mm to effect a match at the angle (a) of 35° in TABLE I, from the spherical surface more sharply than does the asphericity of the Evans patent, bearing in mind that the condition k=0 (a spherical surface) is represented by the ordinate in the graph of FIG. 1 which compares the results of Table I with the results of Table II. It will be appreciated that the elongation E' or asphericity of this invention may be made equal to the asphericity of the Evans patent at any chosen angle (a) by controlling (n) in equation (1) of this invention. These curves are also in FIG. 1. It has been found that by controlling (n) to obtain a match with the asphericities at different angles (a) of the Evans patent, as is shown in Table II, it is often possible to obtain optical performance with this invention which has surprisingly been found as good as the optical performance of the Evans asphericity, at least to the degree which can be determined subjectively by the patient. In this regard however, it is to be noted that deviation from the Evans patent asphericities within the optic zone of about 30°, and especially at angles (a) of 5° and 10° (optic zones of 10° and 20° respectively), contributes to unacceptable optical performance much more sharply than is produced by deviations in the optic zone of about 40° or 50° to 70°. For this reason, a curve or curves in FIG. 1, in accord with TABLE II, should be chosen which most closely matches the Evans patent asphericities at angles (a) of 5° and 10° without doing undue violence to asphericities beyond about 30°. In general, a deviation at any angle (a) which is not more than about 1 micron within the optic zone of about 40°–50° will provide useful optical performance so long as the deviation beyond this optic zone does not exceed about 3 microns.

However, by varying (m) while observing any necessary change in (n) required by (n)=E'$_{(evans\ pat)}$/sin (35), as in TABLE III, an even closer match is possible, and noting that one must calculate (n)[sin (m)−sin (m−a)], as follows:

TABLE III

| | m = 55° n = .023 mm | m = 50° n = .022 mm | m = 45° n = .020 mm | m = 40° n = .020 mm |
|---|---|---|---|---|
| 5° | .0012 | .0012 | .0012 | .0013 |
| 10° | .0025 | .0027 | .0026 | .0028 |
| 15° | .0040 | .0042 | .0041 | .0044 |
| 20° | .0056 | .0058 | .0056 | .0060 |
| 25° | .0073 | .0075 | .0073 | .0076 |
| 30° | .0091 | .0093 | .0089 | .0093 |
| 35° | .0110 | .0112 | .0107 | .0111 |

From TABLE III, it is evident that a value of (m) as large as possible should be chosen in order to obtain better matches in the regions of 5° and 10°.

In TABLE IV which follows, both (m) and (n) are varied to achieve a even better match.

TABLE IV

| | m = 53° n = .020 mm | m = 55° n = .017 mm | From TABLE I |
|---|---|---|---|
| 5° | .0010 | .0009 | .0002 mm |
| 10° | .0022 | .0019 | .0009 mm |
| 15° | .0035 | .0029 | .0020 mm |
| 20° | .0049 | .0041 | .0035 mm |
| 25° | .0063 | .0054 | .0055 mm |
| 30° | .0079 | .0067 | .0081 mm |
| 35° | .0095 | .0081 | .0112 mm |

From TABLE IV, it will be seen that using (m)=55° and (n)=0.17 mm, the match within the optic zone of 50° is not more than one micron at any angle and, beyond this optic zone, is not more than three microns.

Reference to FIG. 1 will reveal the graphical difference between the asphericity of this invention and the Evans patent, based upon the specific data of Tables I and II. In this Figure, the lower line indicates the asphericity of the Evans patent, in microns, as a function of the polar angle up to 35° which represents the maximum angle of 70° for the optical zone of the lens. The upper line represents the asphericity of this invention in the case in which the offset for the controlling circular surface is adjusted to cause the asphericities at 35° for this invention and for the Evans patent case to be substantially the same, and requiring the radial offset (n) to be adjusted to 19 microns. In the Evans patent case, when k=0, there is no asphericity at any angle and the surface generated on the lens is spherical, corresponding to k=0 lying along the ordinate of the graph. Clearly, the asphericity of this invention in FIG. 1 does not conform as closely to the spherical case even though the value of (n) has been chosen to obtain approximately the same asphericity at the periphery of the lens surface. The ability of this invention to provide a proper match with respect to about the maximum Evans patent asphericity while doing so with a reasonably large value of (n) is of extreme importance. As will now be described in conjunction with FIG. 2, the mechanism for achieving the correct asphericity with this invention is relatively simple and straightforward and any accurate contact lens lathe with optical radius turning capability may be modified easily to obtain the requisite results.

Referring to FIG. 2, the diamond tip tool T is centered by the optical radius turning attachment about the center o so that, normally, the tool would cut a perfectly spherical surface SP on the lens blank. However, in accord with this invention, the tool T is slidably mounted with respect to the tool carrier 10 and is spring biased by the spring 12 to a limit position which determines the radius $p=R=r+C$ which the tool will cut at the vertex of the lens, the distance o-K being equal to r and the distance K-C being equal to C. The tool post assembly mounts a member F having a flat In FIG. 2, various reference characters are illustrated more than once in order to show the geometric shapes which are relevant. For example, there is the rectangle whose corners are o, K, P, c whereas the corresponding rhombus is shown in dashed lines having the corners o, K, P', c. The sides n, r, n, r are of the same lengths in any case and the offset or eccentricity E' changes continually to trace a path of the tool T from C to C'. side surface t which bears tangentially against the circular side surface S of the circular controlling surface CS mounted for radial offset with respect to the center o, perpendicular to the lathe spindle axis A (back and forth as indicated by M) to set the offset as indicated at (n). The member F tangentially engages the surface S at the point P so that the line $o-K=r$ where r is the radius of the controlling surface S. As the tool post is rotated or swung about the center point o, the member F by its tangential bearing engagement against the circular controlling surface S compresses the spring 12 and thus shifts the tool away from the spherical path SP to create the elongation of the radius being cut to produce the asphericity E' as shown. When the tool is at the position T' corresponding to the angle indicated as (a), the point K will have moved to the position K' and the flat surface t to the position t'. Since the distance between K and C is the constant C at any angle (a), the distance K'-C' likewise is this constant and the elongation or asphericity E' is caused by the lateral shift of the member F effect by the controlling surface member CS. As is shown by the parallelograms r, n, r, n, the asphericity E' is equal to (n) sin (a) for the particular case illustrated.

FIG. 2a illustrates the case for the situation in which the carrier and adjusting mechanism for the controlling surface is swung about the center o to the initial angle (m). For this case, the asphericity at any angle (a) can be shown to be equal to $[r-(n) \sin (m)]-[r+(n) \sin (m-a)]=(n) [\sin (n) - \sin (m-a)]$. Equation (1) expresses the general equation satisfying the case of FIG. 2a and also the FIG. 2 where $(m)=0°$, reducing to $p=R+(n) \sin (a)$.

Figure 3:
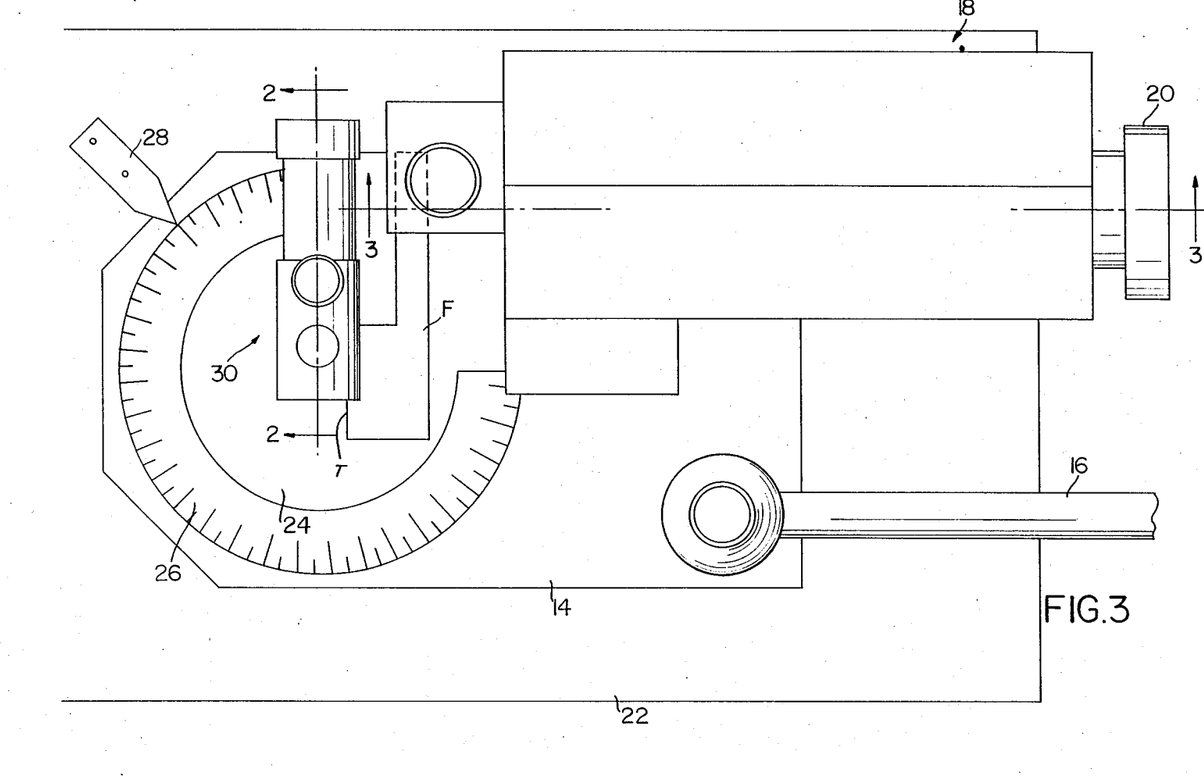
FIG. 3 is a diagrammatic plan view of the optical radius turning attachment of a Hardinge lathe and illustrating the general arrangement of components in accord with an embodiment of this invention.

FIG. 3 is a plan view of a Hardinge lathe with optical turning radius attachment, modified according to this invention. The swivel slide 14 with its manual swinging handle 16 is shown and the tool post assembly is indicated at 18 and has a feed screw turning knob 20, as is conventional. The top slide 22 mounts the pivot post 24 which determines and locates the center o and is movable back and forth parallel to the lathe spindle axis by conventional feed screw mechanism not shown. The angle indicator 26 is carried by the swivel slide 14 and the pointer 28 is carried by the top slide 22. The member F is fixed to the tool post 18 so that its flat side surface t is perpendicular to a vertical plane passing through the lathe spindle axis, as in FIGS. 2 and 2a. The assembly 30 houses the laterally shiftable controlling member CS and is better illustrated in FIGS. 4 and 5. Suffice it to say that the assembly 30 is mounted on the pivot post 24 coaxially of its center o so that the assembly 30 remains oriented perpendicular to the lathe spindle axis, or at the angle (m) thereto, as the swivel slide 14 and the tool post carried by its are swung, as is also indicated in FIGS. 2 and 2a. Accurate mounting of the assembly 30 is assured by mounting it coaxially and preferably rotatively of the post 24 and is an important feature because such mounting, with the adjustment for offset (n), offers the largest value of (n) for a corresponding maximum asphericity for which the controlling circular surface must be set. It is important to note that the movement M of the circular controlling surface CS is radial with respect to the center o so that as the angle (m) is increased, the greater will be (n) to produce the same lateral offset of the surface S relative to the lathe spindle axis.

Figure 4:
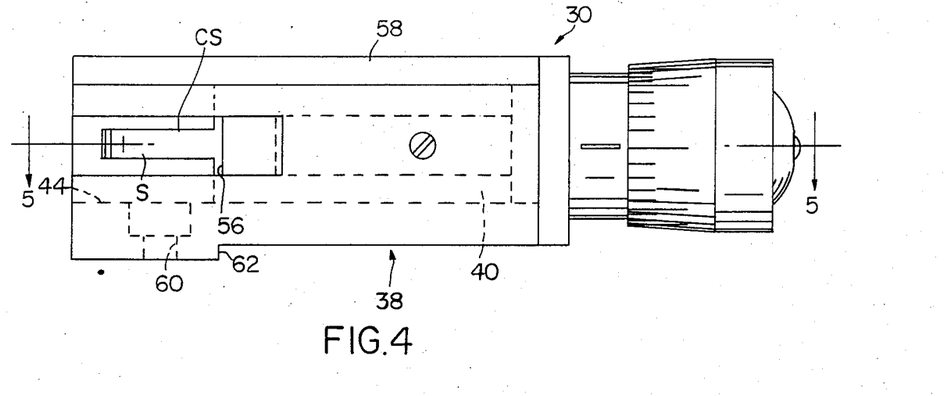
FIG. 4 is a side elevational view of an embodiment of the controlling circular surface attachment of this invention.
Figure 5:
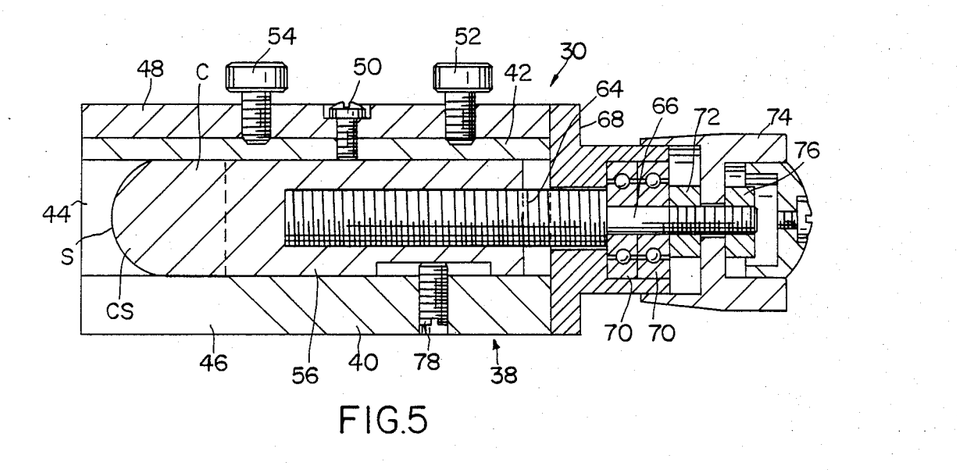
FIG. 5 is a sectional view taken along the plane of section line 5—5 in FIG. 4.

Thus, as is seen in FIGS. 4 and 5, the assembly 30 conveniently takes the form of a body 38 of U-shaped configuration having opposite side walls 40, 42 and a bottom 44. One side wall 40 has a slot 46 for receiving the member F and the opposite side wall 42 has a side cover 48 attached thereto by the threaded member and carrying the locking bolts or screws 52 and 54. The circular controlling member CS has a main body portion of square cross section snugly received in the body 38 whose open top is closed by the cover 58. The bottom 44 is provided with a countersunk opening 60 and a stepped portion 62 so that it may be fixed to the pivot post 24 in coaxial relation thereto and in aligned perpendicular relation to the vertical plane passing through the lathe spindle axis, as noted before. The body 56 is provided with a recess having internal threads receiving the threads 64 of the lead screw 66. The lead screw is fixed against axial movement by the end cap and its associated bearings 70, the lock nut 72, knob 74 and further lock nut 76. The side 40 receives a locking screw 78 which cooperates with the screws 52 and 54 not only to lock the body 56 in adjusted position but also to minimize any lost motion from side-to-side or up and down of the body 56. With suitable precision machining, the components are constructed such that the center c is precisely aligned with the center o and dependent upon the adjustment of the lead screw 66, the motion M is imparted to the circular controlling surface CS precisely perpendicular to the lathe spindle axis and in alignment to pass through a position precisely coaxial with the center o. In this manner, offset (n) may be adjusted accurately and reproducibly to within an interpolated fraction of a micron by the lead screw 66. Thus, a precise desired maximum asphericity may be generated or cut on a lens blank which, as described above, provides the optical requirements of a patient just as if the aspheric curve in accord with the Evans patent had been cut.

It is probable that a complex system of cams, arms and templates could be devised for generating the Evans patent asphericity, but in view of the very small deviation from a spherical surface which is required to achieve such asphericity, such mechanisms would be largely self-defeating and cannot be seriously considered. This is the principal value of the extremely simple and straightforward arrangement of this invention. It has been found that the values of (n) and also of (m) are large enough to be accurately and reproducibly set and maintained. Although some improvement can be contemplated by using a similar arrangement to retreat the work relative to the tool and even to impart both retreat of the tool and retreat of the work, the additional complications in components does not appear justified at this time.

Moreover, it will be appreciated that instead of using a swingable assembly 30 to set the angle (m), the flat surface F could be mounted for angular adjustment to accomplish the same purpose. However, the simpler solution appears to be to mount the assembly 30 for angular adjustment instead.

It is to be understood that the lens blank is cut when it is in the dehydrated state. It will also be understood that the back or posterior surface of the dehydrated blank is provided with a spherical surface, so that, not until the finished lens is hydrated can the back surface conform to the wearer's corneal curvature.

Obviously, many other modifications and variations of the present invention are made possible in the light of the above teachings. It is therefore to be understood that within the scope of the appended claims the invention may be practiced otherwise than as specifically described.

What is claimed is:

1. A contact lens of soft, pliable opthalmic plastic material, said lens when in its dehydrated state having a spherical back surface which in its hydrated state conforms to the corneal curvature of the wearer's eye and, when in its dehydrated state, having an aspheric front surface which is a surface of revolution of polar coordinate form, having an asphericity which is a function of (n) {sin(a)} where (a) is the polar angle, and (n) is a radial offset of a tool-controlling circular surface and is equal to at least about 0.013 mm.

2. A contact lens as defined in claim 1 wherein the equation of the aspheric front surface, in polar form, is p=r+(n) {sin (m)−sin (m−a)}, where (m) is a rotational angle of the radial offset (n) and is equal to at least about 40°.

3. A contact lens of soft pliable opthalmic plastic material, said lens when in its dehydrated state having a spherical back surface which in its hydrated state conforms to the corneal curvature of the wearer's eye and, when in its dehydrated state having an aspheric front surface which is a surface of revolution whose asphericity, in polar form and having a polar angle, is a function of {sin (m)−sin (ma−a)} where (a) is the polar angle and (m) is a fixed angle.

* * * * *